Jan. 1, 1935.  J. O. HEINZE  1,986,436
TRANSMISSION MECHANISM
Filed July 3, 1933  3 Sheets-Sheet 1
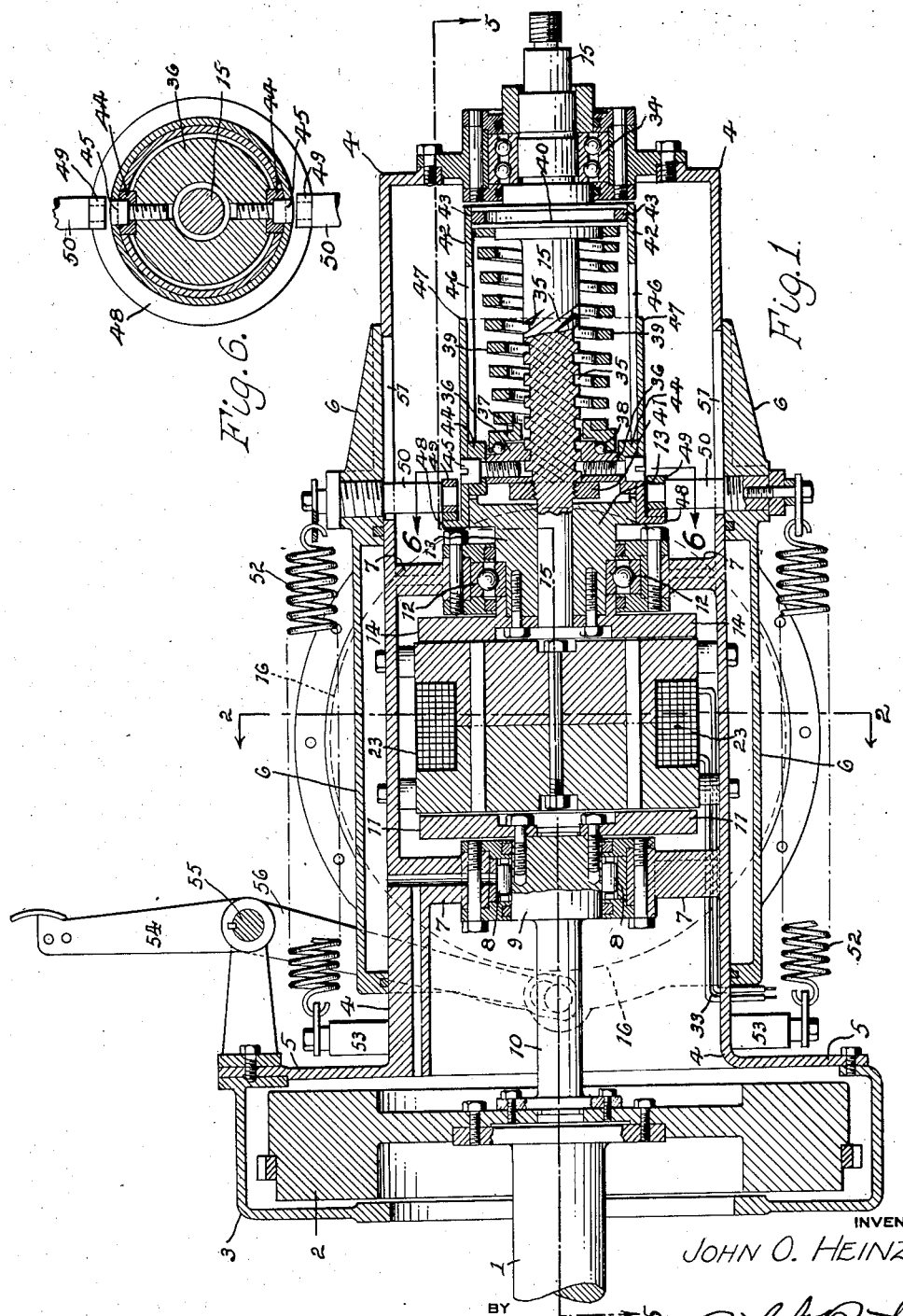
INVENTOR
JOHN O. HEINZE
BY
ATTORNEYS Jan. 1, 1935.   J. O. HEINZE   1,986,436
TRANSMISSION MECHANISM
Filed July 3, 1933   3 Sheets-Sheet 2
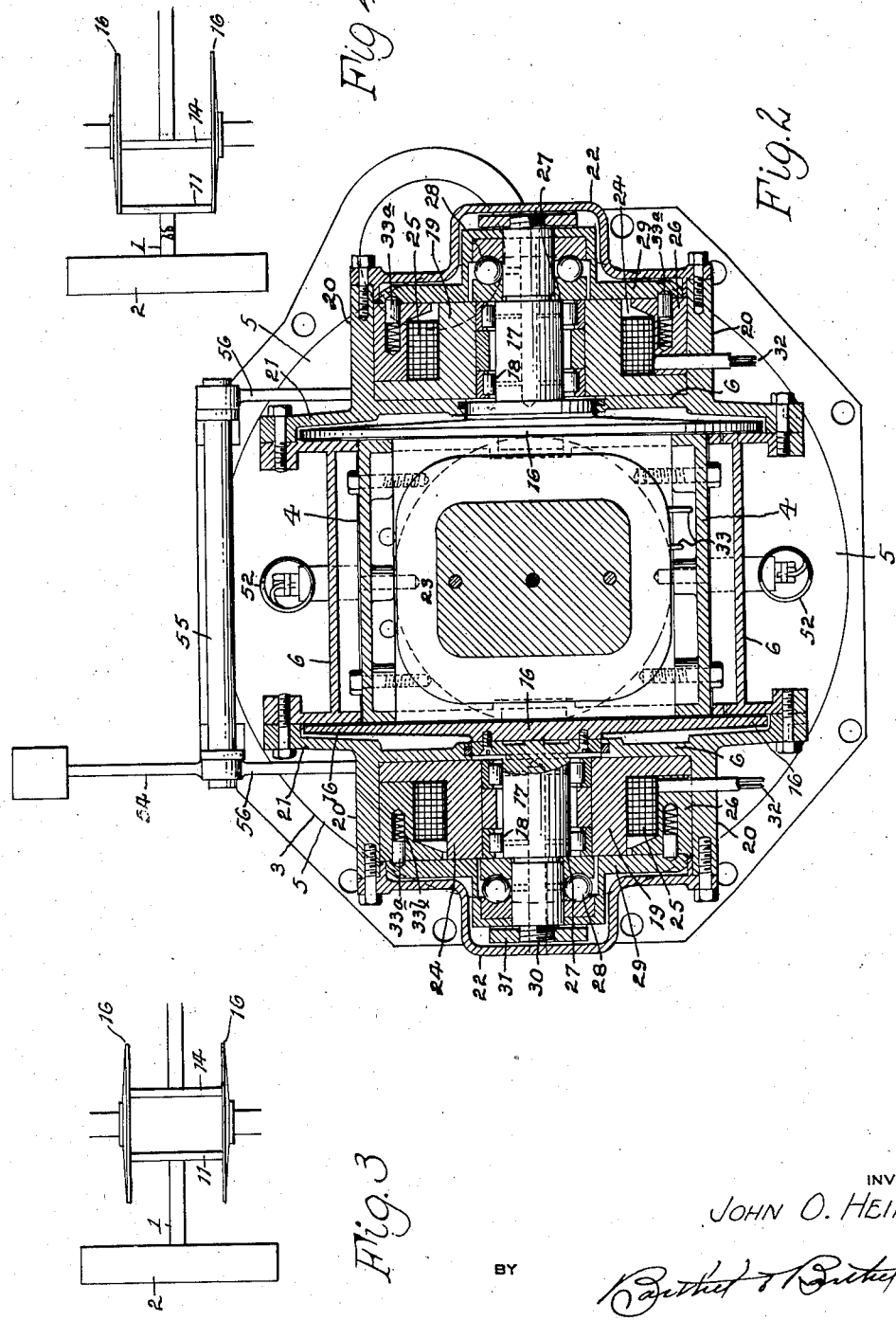
INVENTOR
JOHN O. HEINZE
BY
ATTORNEYS Jan. 1, 1935. J. O. HEINZE 1,986,436
TRANSMISSION MECHANISM
Filed July 3, 1933 3 Sheets-Sheet 3

INVENTOR
JOHN O. HEINZE
BY
ATTORNEYS

Patented Jan. 1, 1935

1,986,436

UNITED STATES PATENT OFFICE 1,986,436

TRANSMISSION MECHANISM

John O. Heinze, Detroit, Mich., assignor to Heinze Development Company, a corporation of Michigan Application July 3, 1933, Serial No. 678,787

11 Claims. (Cl. 74—190.5)

This invention relates to power transmitting mechanism of the change speed type, and more particularly to transmission mechanism especially adapted for embodiment in motor vehicle construction.

An object of the present invention is to provide an arrangement of change speed mechanism together with means whereby speed changes are automatically effected by changes in torque, that is changes in resistance to rotation of the driven member or shaft for transmitting motion to the driving wheels of a motor vehicle when the present mechanism is embodied in a motor vehicle construction; and further to provide a friction power transmitting change speed mechanism which is automatic in the operation of shifting the friction members to effect a change in speed. A further object is to provide a change speed mechanism embodying friction disks so arranged as to eliminate thrust upon the bearings therefor, when these disks are forced into frictional contact with each other to transmit motion from the driving to the driven disks, and to provide an arrangement wherein the relative shifting of these disks to effect a change of speed is facilitated.

It is also an object to provide a simple, compact and efficient arrangement of friction power transmitting disks, which arrangement is such as to particularly adapt the construction to the employment of an electro-magnet or magnets for the purpose of bringing these disks into frictional contact with each other, and to insure ample frictional engagement of said disks, by supplementing the effect of a main electromagnet, by that of additional electromagnets to move the power transmitting disks into frictional contact with driving and driven disks.

It is a further object of the present invention to provide an arrangement whereby very efficient supporting and guiding means is provided for the transmitting disks, which supporting means is movable to change the position of said disks relative to the driving and driven disks, said means affording a complete housing for said transmitting disks and which housing is slidable upon and guided by a fixed housing for said driving and driven disks, all movable parts, bearings, and electromagnets for moving said transmitting disks into frictional engagement with said driving and driven disks, being housed within said housing. It is also an object to provide certain other new and useful features in the construction, arrangement and combination of parts, all as hereinafter set forth and more particularly pointed out in the appended claims, reference being had to the accompanying drawings in which Figure 1 is a central longitudinal vertical section through a structure illustrative of an embodiment of the present invention;

Fig. 2 is a transverse section substantially upon the line 2—2 of Fig. 1;

Figs. 3 and 4 are diagrammatic views illustrative of the arrangement and operation of the friction disks;

Fig. 6 is a sectional detail substantially upon the line 6—6 of Fig. 1.

Figure 5:
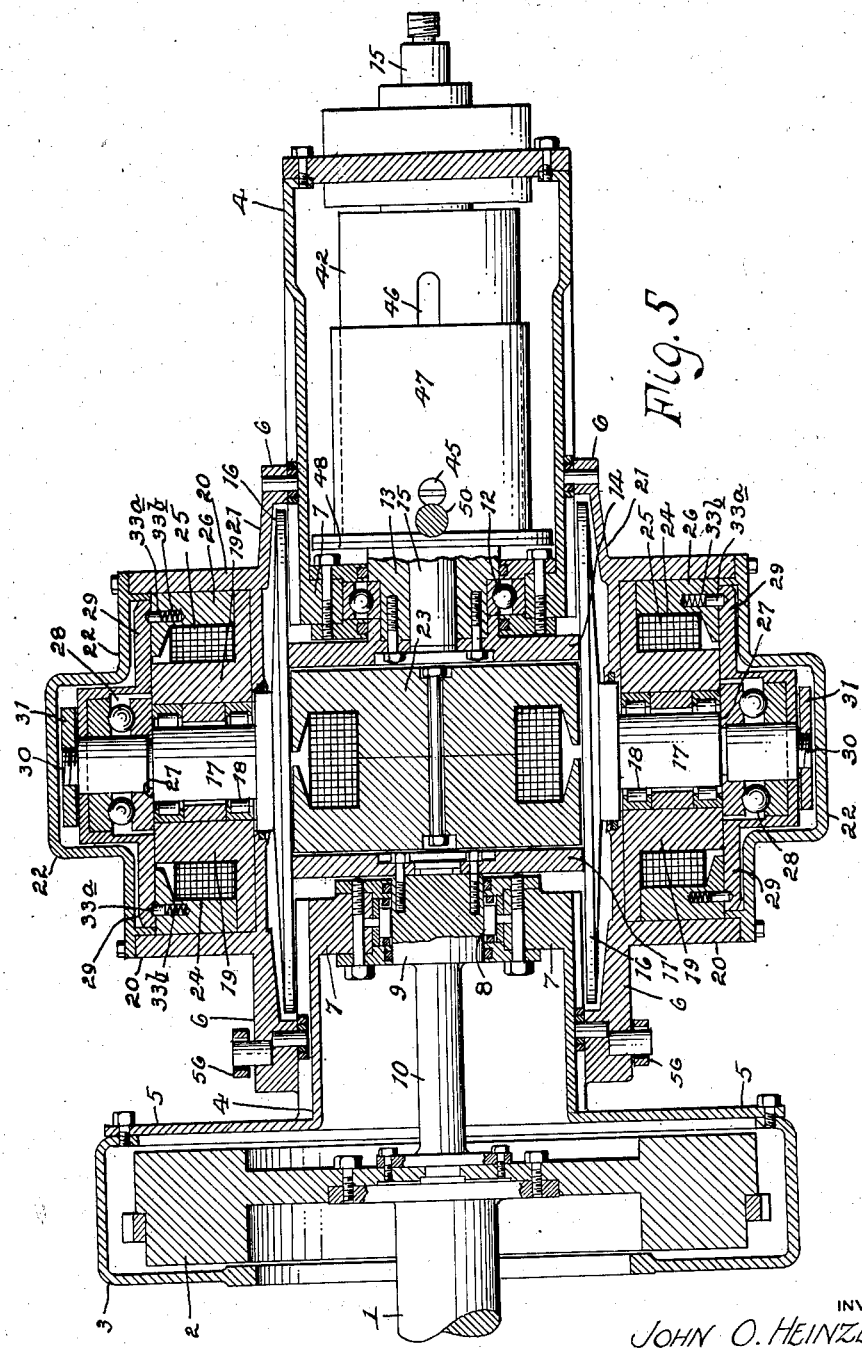
Fig. 5 is a longitudinal section substantially upon the line 5—5 of Fig. 1.

The present device as shown in the accompanying drawings, is particularly adapted for use in a motor vehicle construction, 1 indicating the engine shaft upon which is secured the usual fly wheel 2 within a casing 3 from the rear side of which fly wheel casing a casing for housing the change speed transmission mechanism extends, said transmission casing comprising an inner fixed casing 4 having an integral end flange 5 for attachment to the fly wheel casing and forming a detachable cover therefor.

This inner or fixed casing 4 extends rearwardly from the fly wheel casing for a considerable distance and is of substantially rectangular shape in cross section, and slidable longitudinally of and upon this inner casing is an outer casing 6 of similar cross sectional shape. The inner casing 4 intermediate its ends is formed with transverse bearing walls 7 spaced apart, the forward wall being provided with a bearing 8 of any suitable construction in which is mounted the enlarged rear end or head 9 of a driving shaft 10, the forward end of which shaft is extended through the open forward end of the casing 4 and secured to the fly wheel 2 in axial alignment with the engine shaft 1.

Secured in any suitable manner to the rear end of the head 9 of the driving shaft 10 is a driving disk 11 which is of a diameter just slightly greater than the over-all width of the casing 4 so that its periphery will project just slightly through openings in the opposite sides of said casing 4 between the bearing walls 7 thereof, and mounted in a suitable bearing 12 in the rear wall 7, is a head 13 to the forward end of which is secured, in any suitable manner, a driven disk 14 in axial alignment with and in spaced apart relation to the driving disk 11 and of a diameter exactly equal thereto. A driven shaft 15 has a reduced forward end engaged within an axial bore of said head 13 and adapted to turn therein independently of said head, motion being transmitted from said head to said shaft in a manner hereinafter described.

To transmit motion from the driving disk 11 to the driven disk 14, is a pair of like transmitting disks 16 each secured upon the inner end of a stub shaft 17, and the stub shafts being mounted in roller bearings 18, which bearings in turn, are mounted within core blocks 19 fitting closely within cylindrical hub flanges 20 on circular plates 21 bolted to the opposite side walls of the casing 6 over the openings therein through which the peripheries of the disks 11 and 14 project, which plates form recesses or chambers within which said disks 16 are housed with their contact faces in opposed relation to the peripheries of said disks 11 and 14. Caps 22 are detachably secured to the outer ends of the hub flanges 20 and together with said plates and flanges, form closed chambers for housing said stub shafts and bearings, together with electro-magnets, one in each hub, which magnets are hereinafter more fully described.

To transmit motion from the driving disk 11 to the driven disk 14, the transmission disks 16 must be moved into firm frictional contact therewith, and therefore the stub shafts 17 to which said disks 16 are secured are free to move longitudinally within their bearings a very limited distance. To draw these disks 16 toward each other into firm frictional contact with diametrically opposed points of the peripheries of the driving and driven disks, a main electro-magnet, indicated as a whole by the numeral 23, is secured in any suitable manner, to the top and bottom walls of the fixed casing 4, between and in spaced relation to said driving and driven disks, the poles of said magnet being arranged opposite said disks 16 and close thereto, the said disks thus forming the pole pieces upon which the magnetic force acts to move said disks toward each other into frictional contact with said driving and driven disks. This main magnet 23 is, therefore, in fixed relation to and rigidly supported between the driving and driven disks, with its poles in position to act upon the disks 16 no matter to what position said disks are moved relative to the disks 11 and 14 by the movement of the outer casing 6 longitudinally upon the inner casing 4.

To supplement the action of the electro-magnet 23 or to act independently thereof in forcing the disks 16 into contact with the disks 11 and 14, an electro-magnet indicated as a whole by the numeral 24, is enclosed within each hub chamber formed by each hub flange 20 and surrounds the stub shaft 17, the core blocks 19 forming a support for the core winding 25 with a ring 26 surrounding the winding and fitting closely within the hub flange 20. The outer end portion of each stub shaft is reduced in diameter, forming a shoulder 27 against which is positioned a bearing 28 on the shaft, this bearing being housed within a chamber or recess formed at the center of a disk 29 which lies against and spans the space between the outer ends of the core block 19 and ring 26 and forms the pole piece of the magnet. The outer end of each stub shaft 17 is further reduced and screwthreaded, as at 30, to receive a nut 31 for engaging the recessed portion of said pole piece 29 so that said stub shaft and its disk 16 will be moved upon energization of said magnet, to force said disk into firm frictional contact with the driving and driven disks. These magnets 24 may therefore be energized simultaneously with the energization of the main magnet 23 to supplement the action of the same in forcing the disks 16 simultaneously into frictional contact with the driving and driven disks, or they may be energized separately from said main magnet as desired, they being provided with leading-in wires 32 separate from the leading-in wires 33 for the main magnet which are led in along the bottom wall of the inner fixed casing as shown in Fig. 1.

To prevent rotation of the pole piece or disk 29 with the stub shaft 17, pins 33a are set into bores in the ring 26 and are normally forced outwardly by springs 33b in the bottoms of said bores, into engagement with like bores in the adjacent face of the disk 29. These spring pressed pins 33a also serve to move the disk 29 away from the ring 26 upon deenergization of the magnet, and thus move the shaft 17 endwise and the disk 16 carried thereby, out of contact with the disks 11 and 14.

To automatically move the outer casing 6 longitudinally of the inner fixed casing 4 and thus shift the position of the transmitting disks 16 relative to the fixed position of the driving and driven disks to change the speed, the driven shaft 15 which is mounted at its forward end within the bore of the head 13 and at its rear end within a bearing 34 mounted upon the rear end wall of the casing 4, is formed with a screwthread 35 intermediate its ends, and engaging this screwthread, is a nut 36 opposed to the rear side of which is a bearing ring 37 with balls 38 interposed so that the nut may turn freely without turning the ring, and seated at one end against this ring, is a heavy coiled spring 39, the opposite end of which is seated against a channel rib 40 on the shaft 15. Said spring thus exerts a force to normally hold said nut moved forwardly on said shaft and in contact with a stop collar 41 secured in any suitable manner upon said shaft. The head 13 to which the driven disk 14 is secured, is formed with a rearwardly extending tubular portion 42 enclosing said nut 36 and spring 39 with the extreme rear end of this sleeve provided with an internal rib or ring 43 to engage within the channel 40 of the shaft 15 and thus support the end of this sleeve and connect it to the shaft but permitting one to turn relative to the other. To connect this nut 36 with the tubular extension 42 of the head 13 so rotation of the head will impart rotation to said nut, blocks 44 are secured to the nut by screws having heads 45, and these blocks are engaged within longitudinal slots 46 in said tubular extension.

By properly proportioning the force of expansion of said spring 39 to the resistance of the rotation of the driven shaft 15 when the transmitting disks 16 are in mid position or in position to transmit motion at a ratio of one to one, as shown diagrammatically in Fig. 3, said spring will offer sufficient resistance to the movement of said nut along its screwthreaded connection with said shaft, to cause said shaft to turn with said nut; said head 13 with its extension sleeve 42, said nut and said shaft with said spring, turning as a unit and driving said driven shaft, which shaft transmits motion to the driving wheels when the device is embodied in a motor vehicle.

However, should the resistance to rotation of the driven shaft 15 be increased, said spring 39 will be compressed by rotation of said nut 36 relative to said shaft through the connection of said nut with said sleeve 42 which is a part of the head 13, and due to the screwthread connection of said nut with said shaft, said nut will be moved rearwardly upon said shaft, said blocks 44 moving rearwardly in said slots 46 in said sleeve 42. Sleeved upon this sleeve extension 42 of the head 13, is an outer sleeve 47 and as the heads 45 of the screws which connect said blocks to said nut, project outwardly beyond said blocks into holes in said outer sleeve 47, said outer sleeve will be moved longitudinally upon the extension 42 by the rearward movement of said nut, and as the forward end of said sleeve 47 is formed with an outwardly extending flange 48 engaged by rolls 49 on the ends of studs 50 carried by and projecting inwardly from the rear end of the outer casing 6 through longitudinal slots 51 in the upper and lower walls of the inner casing 4, this rearward movement of said sleeve 47 will move said outer casing rearwardly, thus shifting the transmitting disks 16 rearwardly from their normal or one to one speed position with the line of their axes midway between the driving and driven disks, and thus automatically reduce the speed and increase the power applied to the driven shaft in accordance with the increased resistance to rotation of said shaft.

When resistance to rotation of said driven shaft 15 decreases back to normal, said spring 39 will force the said nut back into contact with the stop 41 and as the flange 48 moves out of contact with the rollers on the studs 50, the outer casing 6 is moved forwardly by coiled springs 52 external of said casings, they being attached at their rear ends at convenient points to the outer casing and at their forward ends to studs 53 projecting outwardly from the inner casing, these springs normally maintaining the said rollers on the inner ends of said studs in contact with said flange 48.

Therefore shifting of the transmission mechanism to change the speed and automatically compensate for changes in torque requirements is effected; and when this present transmission mechanism is embodied in a motor vehicle construction, when the vehicle is moved from a standing position, it is unnecessary to effect a change of speed by a manual shifting of the transmitting disks because the increased resistance to relation of the driven shaft will automatically effect a shifting of these disks to low speed position, and as the vehicle gets under way, the transmitting disks will gradually be brought back to normal running or one to one ratio position by said springs 52, and the speed of the engine may be increased or decreased to change the speed of the vehicle.

Also in proceeding up grade, the increase in torque resistance, will automatically effect a shifting of the transmitting disks without attention by the operator, and this change is quickly made due to the pitch of the thread 35, the resistance of said spring to the movement of said nut along said shaft, being such that minor changes in torque will not effect a change of transmission speed, but such changes in torque will be taken care of by engine speeds.

The only time when manual shifting of the transmission mechanism is necessary, is when it is desired to reverse the direction of rotation of the driven shaft, as in backing up the vehicle, to effect which reversal it is necessary to shift the transmitting disks to the position shown in Fig. 4, with both driving and driven disks engaging the transmitting disks at the same side of the axis of the latter, this shifting being against the action of the springs 52 by means of a foot pedal 54 pivotally supported at 55 with arms 56 extending downwardly and operatively connected at their lower ends to the outer casing 6 at its forward end.

By the present arrangement of friction disks with the transmitting disks movable toward the opposite sides of the driving and driven disks to frictionally clamp the latter between the former, the bearings for these driving and driven disks are relieved from all strain and due to the arrangement of a main electro-magnet between these movable disks and the supplemental magnets arranged at the outer sides of said disks, the bearings for said disks are also relieved from the imposition of any strain thereon due to the forcing of said disks into contact with the driving and driven disks and a very strong frictional contact is maintained. The construction also provides a simple, compact and efficient arrangement particularly adapted for the application thereto of the described means for effecting an automatic change of speed by changes in torque resistance, but it will be understood that such automatic means may be applied to other forms of speed changing mechanisms.

Obviously other changes in the construction, arrangement and combination of parts may be made without departing from the spirit of the invention, and such changes are contemplated.

Having thus fully described my invention what I claim is:—

1. In a change speed mechanism, the combination of motion transmitting means including a driving disk, a driven disk in axial alinement with and in spaced relation to said driving disk, flat transmitting disks of large diameter supported with their common axis extending at right angles to the common axis of said driving and driven disks and in contact with the peripheral edges of said driving and driven disks at diametrically opposite points thereof, and shiftable means for carrying said transmitting disks; a driven shaft in axial alignment with said driving and driven disks; a member having operative connection with said shaft to travel therealong and connected to said driven disk and to said shiftable means of said motion transmitting means; and yieldable means for resisting travel of said member along said shaft.

2. In a change speed mechanism, the combination of motion transmitting means including a driving disk, a driven disk, and shiftable means for transmitting motion from said driving to said driven disk at different speeds including a shiftable casing and a pair of transmitting disks in said casing; a driven shaft; a member driven by said driven disk of said motion transmitting means and having screwthreaded connection with said shaft to travel therealong and connected to said shiftable casing to move the same; and yieldable means to resist movement of said member along said shaft and normally hold said shiftable means in position to transmit motion at one speed and adapted to yield to permit said member to be moved along said shaft to shift said shiftable casing and change the speed when the resistance to rotation of said shaft is increased.

3. In a change speed mechanism, the combination of shiftable means for varying the speed and including a driven member having a tubular extension; a driven shaft formed with a screwthread and extending into said tubular extension; a nut on said shaft engaging said thread and operatively connected with said tubular extension and with said shiftable means to shift the same upon travel of said nut along said shaft; and yieldable means for resisting the travel of said nut in one direction along said shaft.

4. In a change speed mechanism, the combination of shiftable means for varying the speed and including a driven member having a tubular extension formed with longitudinal slots; a driven shaft in said extension in axial alignment with said driven member; a nut having screw-threaded engagement with said shaft and engaging said slots to cause said nut to turn with said extension and permit said nut to travel along said shaft; means operatively connecting said nut and said shiftable means to move together upon travel of said nut; and a spring within said tubular extension to resist travel of said nut and permit such travel upon increase of resistance to rotation of said shaft.

5. In a change speed transmission, the combination of a driving and driven disks arranged in longitudinal axial fixed positions, transmitting disks to contact opposite sides of said disks, and movable means upon which said transmitting disks are mounted for shifting said transmitting disks relative to said driving and driven disks; a driven shaft; a member on said shaft having screwthreaded connection therewith and connected to said driven disk to rotate therewith; means connecting said member on said shaft and said movable means upon which said transmitting disks are mounted; and yieldable means for resisting movement of said member along said shaft.

6. A change speed transmission mechanism including a driving disk, a driven disk, means for rigidly supporting and holding said disks in longitudinal axial alignment, a pair of opposed transmitting disks to frictionally engage the peripheries of said driving and driven disks at opposite points of said peripheries, movable means upon which said transmitting disks are mounted for free rotation thereon, and means for moving said movable means to change the position of said transmitting disks relative to said driving and driven disks to change the speed, and including a driven shaft, a member on said shaft having screwthreaded connection therewith and connected to said driven disk to rotate therewith, means connecting said member on said shaft and said movable means upon which said transmitting disks are mounted, and yieldable means for resisting movement of said member along said shaft.

7. A change speed power transmitting mechanism including a driving disk, a driven disk, an inner fixed casing for supporting said disks and providing bearings therefor to permit free rotation of said disks and to hold the same therein in spaced apart longitudinal axial alignment, a pair of transmitting disks arranged with their axes in longitudinal alignment and at right angles to the axis of rotation of said driving and driven disks, an outer casing movable longitudinally upon said inner casing and providing bearings for said transmitting disks and supporting said disks for free rotation at diametrically opposite sides of said driving and driven disks, means within said inner casing between said driving and driven disks for forcing said transmitting disks axially toward each other and into frictional contact with the peripheries of said driving and driven disks, and means for moving said outer casing upon said inner casing to change the position of said transmitting disks relative to said driving and driven disks.

8. In a change speed power transmitting mechanism, the combination of an inner fixed casing provided with bearings therein, a driving shaft extending longitudinally of said casing and mounted for free rotation in one of said bearings, a driving disk secured to said driving shaft, a driven disk mounted for free rotation in the other of said bearings in said casing and positioned in longitudinal axial alignment with and in spaced relation to said driving disk, an outer casing provided with bearings extending laterally and in axial alignment with each other with their axes at right angles to the axes of rotation of said driving and driven disks, stub shafts mounted in said bearings in said outer casing and free to move longitudinally therein, a transmitting disk upon the inner end of each stub shaft, said disks being in diametrically opposed relation to the peripheries of said driving and driven disks, said outer casing being formed with chambers housing said transmitting disks, means for moving said transmitting disks toward each other into frictional contact with said driving and driven disks, and means for moving said outer casing longitudinally upon said inner casing to change the position of said transmitting disks relative to said driving and driven disks.

9. In a change speed power transmitting mechanism, the combination of a fixed casing of extended length having internal transverse spaced apart walls, a bearing carried by each wall, a driving shaft mounted in one of said bearings, a driving disk secured to said shaft, a driven disk mounted within the other of said bearings in axial and spaced apart relation to said driving shaft and disk, an electro-magnet rigidly supported within said casing between said driving and driven disks, an outer casing slidable longitudinally of said inner casing and provided with bearings extending laterally thereof, and in axial alignment, stub shafts mounted in said bearings on said outer casing and having a limited longitudinal movement in their bearings, a transmitting disk upon the inner end of each stub shaft in opposed relation to the peripheries of said driving and driven disks, an electro-magnet surrounding each of said stub shafts and each having a pole piece mounted thereon to move said shaft endwise upon energization of said magnet, each of said transmitting disks, its bearing and electromagnet being housed within said outer casing, and means for moving said outer casing longitudinally upon said inner casing.

10. In a change speed power transmitting mechanism, the combination of a fixed inner casing provided with internal spaced apart bearings, a driving shaft mounted in one of said bearings, a driving disk secured to the end of said shaft, a driven disk rotatively mounted within the other of said bearings and in spaced relation to said driving disk, an outer casing movable longitudinally upon said inner casing and provided with laterally extending bearings, stub shafts mounted in said bearings, transmitting disks secured to the inner ends of said stub shafts in opposed relation to the peripheries of said driving and driven disks, means within said inner casing operatively connected to said driven disk to turn therewith for automatically moving said outer casing upon said inner casing upon change of torque.

11. In a change speed power transmitting mechanism the combination of a fixed inner casing, spaced apart bearings within said casing, a driving shaft mounted in one of said bearings, a driving disk secured to the end of said shaft, a head rotatively mounted within the other of said bearings, a driven disk secured to said head, an outer casing, movable longitudinally upon said inner casing, transmitting disks mounted in bearings in said outer casing in opposed relation to the peripheries of said driving and driven disks, a driven shaft rotatable independently of said head, said shaft being formed with a screw thread throughout a portion of its length, a nut on said shaft engaging said screw thread, means for operatively connecting said nut with said head to turn therewith, yieldable means to resist movement of said nut along said shaft, and means connecting said outer casing with said nut to move said outer casing upon movement of said nut longitudinally of said shaft.

JOHN O. HEINZE.